Nov. 14, 1961 J. R. ROEHRIG 3,009,060
GAS CHROMATOGRAPHY
Filed Sept. 10, 1956 2 Sheets-Sheet 1

INVENTOR.
Jonathan R. Roehrig
BY
Oliver W. Hoyes

Nov. 14, 1961 J. R. ROEHRIG 3,009,060
GAS CHROMATOGRAPHY
Filed Sept. 10, 1956 2 Sheets-Sheet 2
FIGURE 2
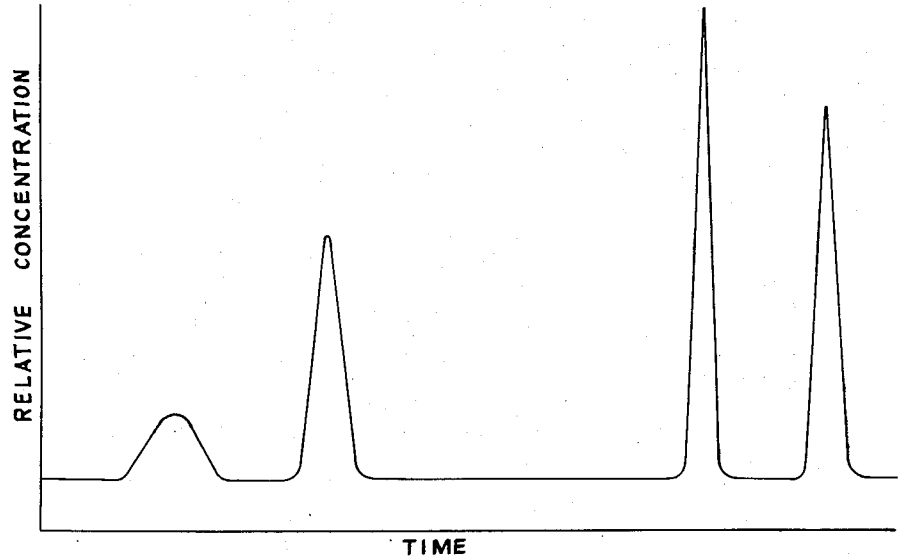
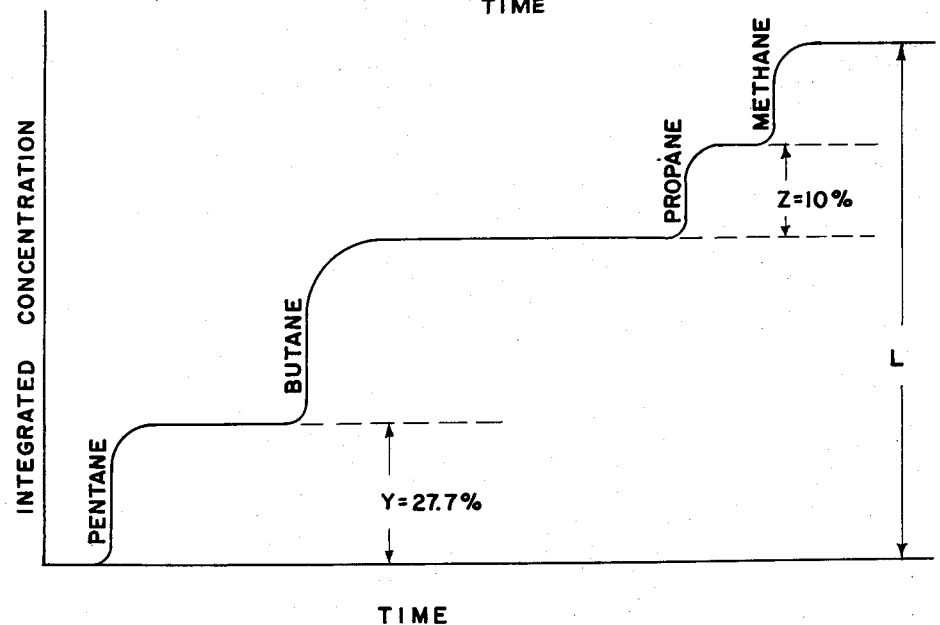
FIGURE 3

United States Patent Office

3,009,060
Patented Nov. 14, 1961

3,009,060
GAS CHROMATOGRAPHY
Jonathan R. Roehrig, Sudbury, Mass., assignor to National Research Corporation, Cambridge, Mass., a corporation of Massachusetts
Filed Sept. 10, 1956, Ser. No. 609,033
1 Claim. (Cl. 250—43.5)

This invention relates to apparatus for the separation and analysis of gases and more particularly to vapor phase chromatographic apparatus for separating the various components of a gas and subsequently identifying them both quantitatively and qualitatively.

The principle of vapor phase chromatographic separations, namely the separation of volatile materials by the utilization of columns having a static liquid phase and a mobile gas phase, is well known. Separation occurs by exploiting the different equilibria existing between these two phases. Instruments embodying this principle have been devised which couple a column involving elution-partition, adsorption-displacement, or, to some extent, elution-absorption techniques, with some sort of suitable detector such as a thermal conductivity cell. Recordings obtained by measuring the detector output result in a series of peaks in which the location of the peak or the magnitude of the elapsed time yield the qualitative information; measurement of the peak heights and areas provides the quantitative information. However, all of these prior are instruments are subject to severe limitations. The sensitivity, speed, range and cost of prior art apparatus, all leave much to be desired. In the instant invention, however, the problems and disadvantages inherent in prior art gas chromatography methods and apparatus have either been substantially solved or circumvented.

Accordingly, it is a principal object of the instant invention to provide improved apparatus for measuring the concentration of each of a number of different gases in a mixture.

Another object of this invention is to provide vapor phase chromatographic apparatus which can integrate the qualitative and quantitative results obtained from the analysis of a gas mixture into a single curve which can be readily interpreted.

Another object of the instant invention is to provide apparatus for the quantitative and qualitative analysis of higher boiling point liquids as well as the lower boiling point liquids.

Still another object of the instant invention is to provide apparatus for the analysis of corrosive liquids.

Other objects of the invention will in part be obvious and will in part appear hereinafter.

The invention accordingly comprises the apparatus possessing the construction, combination of elements and arrangements of parts which are exemplified in the following detailed disclosure, and the scope of the application of which will be indicated in the claim. For a fuller understanding of the nature and the objects of the invention, reference should be had to the following detailed description taken in connection with the accompanying drawings wherein:

FIGURE 2 is a graph of the type obtained from prior art gas chromatography apparatus.

FIGURE 3 is a graph of the type obtained from the instant invention, in which the integrated concentrations are plotted against elution time.

Figure 1:
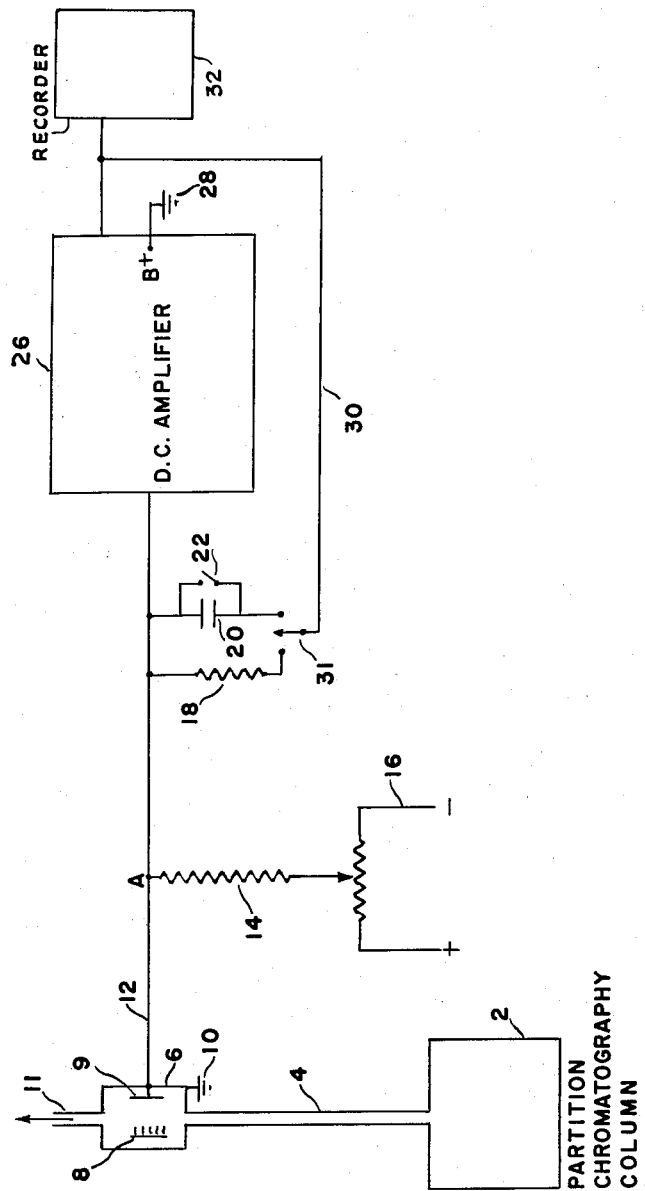
FIGURE 1 is a schematic, diagrammatic illustration of one embodiment of the invention.

In the instant invention, a column suitable to vapor phase partition chromatographic application such as an elution-partition column involving a static liquid phase and a mobile gaseous phase is utilized for the separation of gases in a mixture thereof by taking advantage of the different equilibria existing between these two phases. A carrier gas subsequently elutes the various components of the mixture from the separation column into an ionization chamber. A radioactive source whose rate of emission of ionizing agents is substantially independent of temperature, pressure and electrical field thereabouts, is positioned to radiate ionizing radiation into the ionization chamber. The ionization within the chamber is measured by collecting the ions produced therein and amplifying and indicating the ion current so collected. The ionization current bears a direct relationship to the composition and absolute pressure and temperature of the gas within the chamber. If, then, the pressure and temperature are maintained substantially constant, the relationship of composition to current is that of simple proportionality.

However, along with the ions produced due to the ionization of components of the mixture of gases to be analyzed, many ions are produced by ionization of the carrier gas also. Therefore, in the instant invention means are provided for generating a buckout voltage substantially equal to the amplifier input voltage corresponding to the current produced by ionization of the carrier gas, thereby substantially completely eliminating the adverse effect that this additional ionization would normally have on the end result.

Further, the instant invention completely eliminates one of the most serious disadvantages of prior art instruments. Heretofore, unless relatively expensive supplementary equipment was employed, it has been necessary to integrate manually the area under the peaks in the curve obtained in order to obtain a coherent and accurate picture of the quantitative results. This task was both arduous and time consuming. In the instant case, however, this problem is entirely eliminated. An integrating amplifier coupled to the detector electronically integrates the results obtained, thereby plotting the qualitative and quantitative information in a single curve.

The further advantages of the instant invention over the prior art are too numerous to discuss individually. However, the more obvious are deserving of mention.

Sensitivity in detection and analysis, often a problem in the prior art, is readily raised to one part in a hundred thousand.

Because, in the instant invention, all the results are integrated into a single curve, considerable economy results in the saving of time, if the integration has been done manually, or in saving of equipment costs if it has been done with supplementary equipment.

The range of operation is considerably extended over prior art methods. In the instant invention, analysis of heavier hydrocarbons has become possible. The practical upper limit is the temperature at which the components of the apparatus melt.

Corrosive material can be readily handled in the instant invention. Most prior art apparatus is by its very nature acutely sensitive to corrosive attack. In the instant case, what little metal need be exposed to the mixture of gases to be analyzed, can easily be made of a corrosion-resistant substance, such as stainless steel, thereby substantially completely eliminating the problem of corrosion.

Referring now to the drawings, there is illustrated in FIGURE 1 a preferred embodiment of the invention wherein a vapor phase partition chromatography column 2 is connected by means of a conduit means 4 to an ion chamber 6. The ion chamber 6 comprises a source of ionizing radiation 8 and an ion collector 9. The positive current on the collector 9 due to collected positive ions is carried along the signal lead 12 to resistance 14 which is part of a potentiometer 16. This potentiometer 16 is adjustable so that it can apply at point A, a voltage equal and opposite to the voltage generated by the ion current corresponding only to the ionization of the carrier gas. Accordingly no signal will pass to the D.C. amplifier 26 unless it is in excess of the carrier gas signal, e.g., corresponding to the ionization of a gas being analyzed. A negative feedback taken from the amplifier 26 output and carried by line 30 serves to complete the circuit when connected, by switch 31, to a resistance 18 or a condenser 20. A recorder 32 records the quantity of current flowing which is proportional to the composition of the gas in the chamber when temperature and pressure is maintained constant.

In a particular embodiment of the invention, a sample to be analyzed is fed into the vapor phase partition chromatography column 2. The sample is subsequently eluted from the column and into a stainless steel ion chamber 6 by means of a suitable carrier gas such as helium. Within the chamber 6, beta-ray radiation emitted by a suitable radioactive source, such as radioactive krypton, causes the gas to ionize. The positive ions formed are collected by means of a suitable ion collector 9 such as a fine copper wire, and the current thus produced is carried along the signal to lead 12. The instrument is first preferably zero set to produce a negative buckout voltage at point A substantially equal to and opposite to the positive voltage resulting from the ionization of the carrier gas. The signal produced due to ionization of the carrier gas is thereby substantially completely eliminated since it does not reach the amplifier 26. The signal remaining, after the buckout voltage from the potentiometer 16 has been applied, is fed into the D.C. amplifier 26. A negative feedback taken from the amplifier output is connected to the condenser 20 or the resistance 18 (depending upon the position of switch 31).

If the negative feedback is connected to the resistance 18, the recorder will give a curve of the type illustrated in FIGURE 2 wherein location of the peaks with respect to time indicates the composition of the gas, and the area under the peaks gives information as to quantity.

When the switch 31 is connected to the condenser 20, an entirely different type of curve is obtained. This is due to the fact that when the carrier gas bearing a gas to be analyzed is passed through the system, an integrated curve of the type illustrated in FIGURE 3 is obtained because the individual pulses emanating from the detector are stored on the condenser and the sum of these pulses is recorded as a single integrated curve. Accordingly, the relative composition of the gas is indicated directly. In FIGURE 3, the distance along the abscissa (time axis) yields the desired qualitative information and the distance along the ordinate axis yields the quantitative information.

Whereas it has heretofore been necessary to integrate manually the area under the curve in order to obtain any quantitative results, one has now only to measure directly the height of the various portions of the curve. In FIGURE 3 the distance Z is a direct indication of the relative concentration of propane. For example, if this distance Z referring to propane were 10 percent of the total height L of the curve obtained from a given mixture of gases, it would indicate that 10 percent by volume of the gas being analyzed was composed of propane. Similarly if the distance Y, corresponding to the relative proportion of pentane in the gas being analyzed, were 27.7 percent of the total height L of the curve, it would indicate that the mixture of gases being analyzed contained 27.7 percent by volume of pentane. In the same manner, the concentrations of the other components of the gas could be readily arrived at and the disadvantageous manual integration of the prior art methods completely eliminated.

In another embodiment of the invention, two ion chambers are utilized; the carrier gas and the gas being analyzed are passed through one of the chambers; the carrier gas alone is passed through the second ion chamber. The pressure and the temperature within both chambers is maintained substantially constant. Subsequently the ion currents from the two chambers are collected and only the difference between the two currents is amplified, thereby giving a direct measure of the ion current due only to ionization of the gas being analyzed. In this way, the effect of the ion current due to ionization of the carrier gas is substantially completely eliminated.

It should be pointed out that while only radioactive krypton was specifically mentioned as a source of ionizing radiation, other materials such as radioactive radium, strontium and cobalt would do equally well. Similarly only copper wire was specifically mentioned as an ion collector. However, in cases wherein it becomes desirable to analyze corrosive materials, any corrosion resistant conducting material, such as stainless steel, is entirely acceptable.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

Apparatus for measuring the concentration of each of a number of different gases in a mixture thereof, said apparatus comprising a gas phase partition chromatography column, a source of carrier gas for carrying the gas to be analyzed into said column and for subsequently eluting the individual components of said gas mixture being analyzed from the column and into a detector means, means for providing a source of ionizing radiation within said detector means, means for collecting the ions generated within said detector means, means for converting the collected ion current to a signal current bearing a definite relationship to the quantity of an individual gas component passing through the ion chamber at any given instant of time, means for amplifying the signal current and feeding the signal current to a condenser to provide unidirectional changes of the voltage on the condenser as a function of the amount of signal current fed thereto, and a recorder connected to the condenser means to plot the unidirectional incremental changes of voltage of the condenser with time to provide a single integrated step-like curve wherein the distance of the step along the time abscissa provides the qualitative identification of the various gas components and the height of the step along the voltage ordinate provides the quantitative concentrations of the various gas components.

References Cited in the file of this patent

UNITED STATES PATENTS

| | | |
|---|---|---|
| 2,613,326 | Herzog | Oct. 7, 1952 |
| 2,641,710 | Pompeo et al. | June 9, 1953 |
| 2,688,097 | Friedman | Aug. 31, 1954 |
| 2,702,898 | Meili | Feb. 22, 1955 |
| 2,740,894 | Deisler et al. | Apr. 3, 1956 |
| 2,742,574 | Weisz | Apr. 17, 1956 |
| 2,761,976 | Obermaier et al. | Sept. 4, 1956 |
| 2,765,409 | Hutchins et al. | Oct. 2, 1956 |
| 2,817,764 | Jacobs et al. | Dec. 24, 1957 |
| 2,876,360 | Victoreen | Mar. 3, 1959 |
| 2,899,555 | Fries | Aug. 11, 1959 |

FOREIGN PATENTS

| | | |
|---|---|---|
| 737,386 | Great Britain | Sept. 28, 1955 |

OTHER REFERENCES

Deal et al.: "A Radiological Detector for Gas Chromatography," article in Analytical Chemistry, vol. 28, No. 12, pp. 1958 to 1964, published at a Symposium in April 1956 at Dallas, Texas.

Boer: "A Comparison of Detection Methods for Gas Chromatography Including Detection by Beta Ray Ionization," article in Vapor Phase Chromatography, pp. 169 to 184, June 1, 1956.